April 24, 1934.  G. W. BOOTH  1,956,214
METHOD AND APPARATUS FOR APPLYING CLOSURES
Filed Nov. 26, 1932   5 Sheets-Sheet 1

Inventor
George W. Booth
By Cushman, Dypaut, Darby & Cushman
Attorneys

April 24, 1934.  G. W. BOOTH  1,956,214
METHOD AND APPARATUS FOR APPLYING CLOSURES
Filed Nov. 26, 1932   5 Sheets-Sheet 2
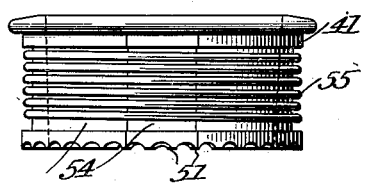
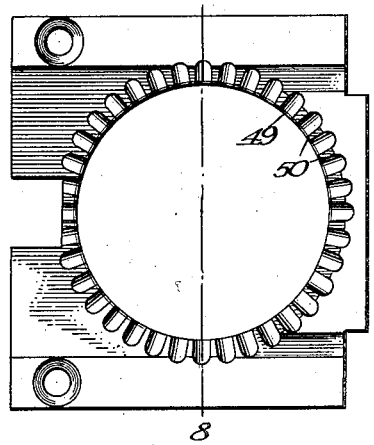
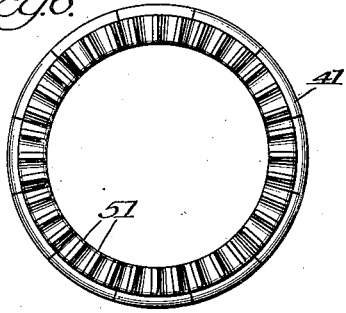
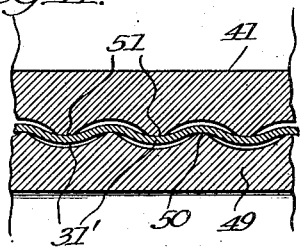
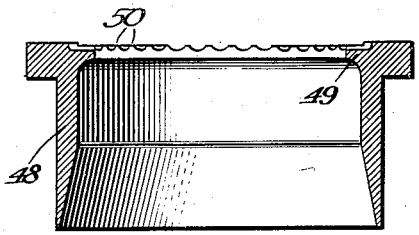
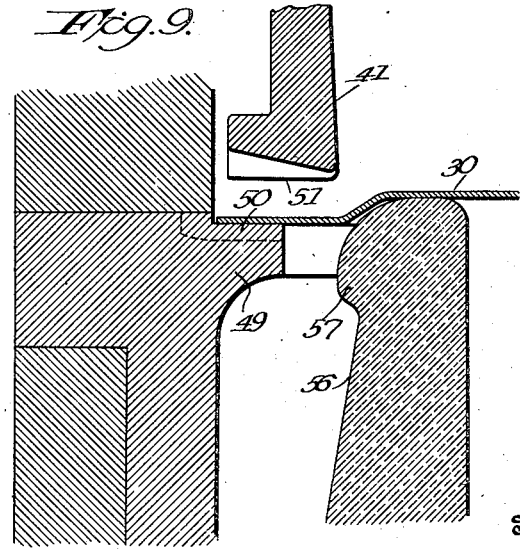
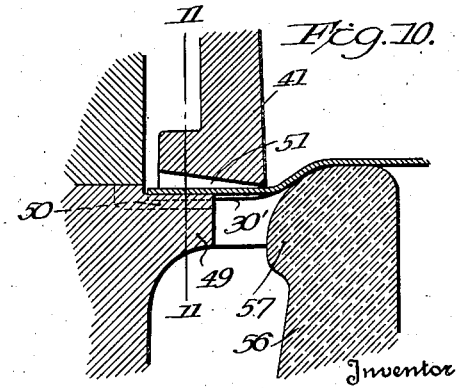
Inventor
George W. Booth

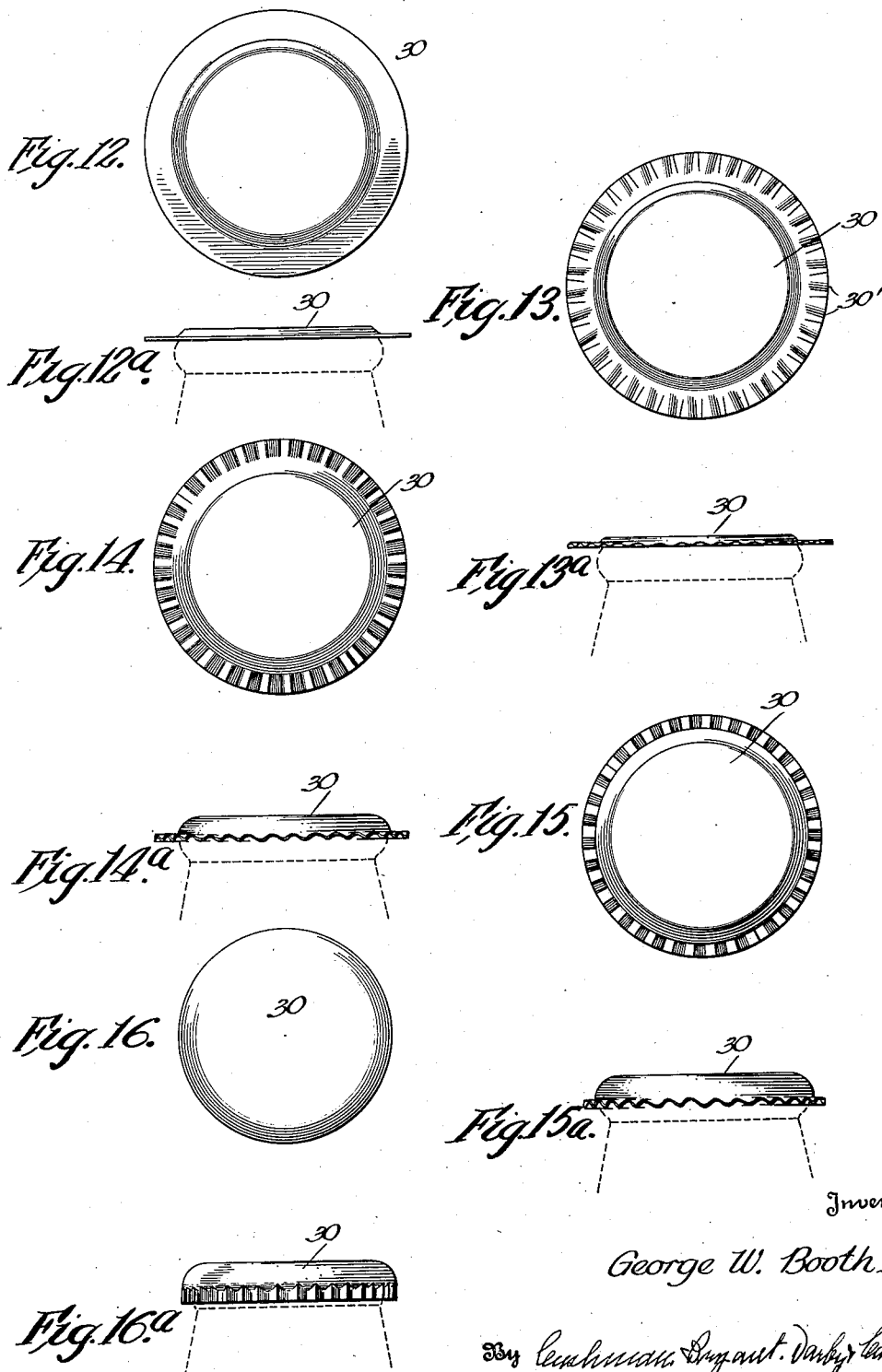

April 24, 1934.  G. W. BOOTH  1,956,214
METHOD AND APPARATUS FOR APPLYING CLOSURES
Filed Nov. 26, 1932    5 Sheets-Sheet 4

Inventor
George W. Booth
By Cushman, Bryant, Darby & Cushman
Attorneys

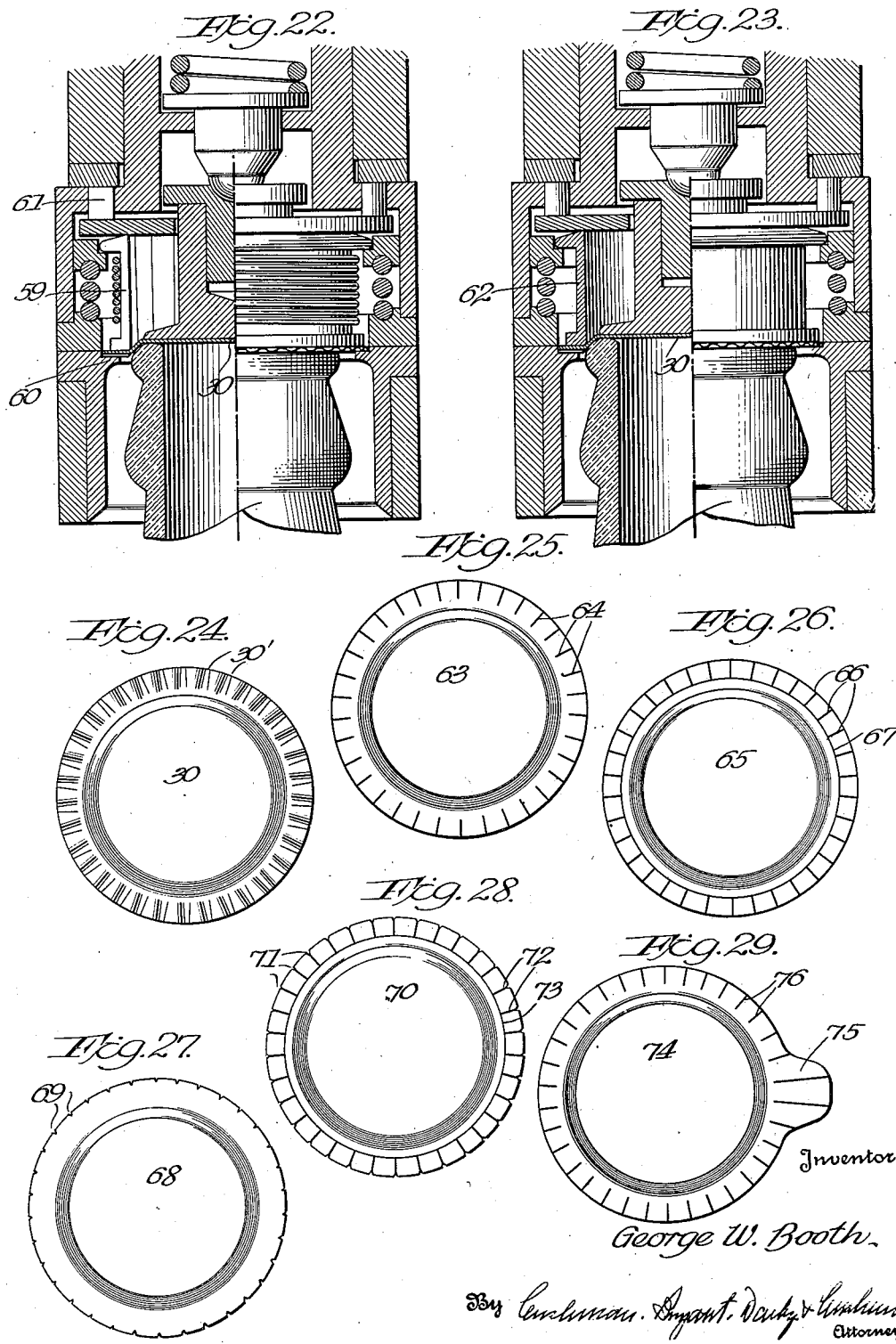

Patented Apr. 24, 1934

1,956,214

UNITED STATES PATENT OFFICE 1,956,214

METHOD AND APPARATUS FOR APPLYING CLOSURES

George W. Booth, Baltimore, Md., assignor to Crown Cork & Seal Company, Inc., Baltimore, Md., a corporation of New York Application November 26, 1932, Serial No. 644,529

10 Claims. (Cl. 226—83)

The present invention relates to modifications in closures of the type described in my copending U. S. application, Serial No. 553,464, filed July 27, 1931, and to certain modifications in method and apparatus for applying the closures described in the said application.

Broadly speaking, whereas the closures of the said application are generally characterized in use by an irregularly crimped locking band, the present invention contemplates principally a closure characterized by a relatively regularly crimped locking band. To this end, the closure discs of the present invention have their marginal portions deformed in original manufacture, or in a supplemental manufacturing step, or upon application to the container so that the locking crimps take place along prescribed lines. Deformation of the marginal portion of the closures is accomplished in any suitable manner as by bending or weakening at predetermined circumferential intervals.

The cap, as applied, has an improved appearance by reason of the regularly spaced locking crimps and these, as affording a uniform circumferential locking effect, are mechanically advantageous especially in the sealing of pressure fluids.

In the accompanying drawings I have shown illustrative embodiments of the various phases of the invention, and the description of the invention will proceed with reference to these drawings, wherein:

Figure 5 shows in elevation the sealing throat appearing in Figures 1, 2 and 4.

Figure 6 is a bottom plan view of the throat of Figure 5.

Figure 7 is a plan view of disc supporting means appearing in Figures 1 to 4.

Figure 8 is a section on line 8—8 of Figure 7.

Figure 9 shows a portion of Figure 1 on an enlarged scale.

Figure 10 is a view similar to Figure 9 but showing the parts in the relation of Figure 2.

Figure 11 is a section on line 11—11 of Figure 10.

Figure 12 shows in plan the original disc as in Figure 1, Fig. 12a showing the same in elevation.

Figure 13 shows in plan the disc of Figure 12 at the step of the capping operation illustrated in Figure 2, Fig. 13a showing the same in elevation.

Figure 14 shows in plan the disc of Figure 12 at a stage of the capping operation between those illustrated in Figures 2 and 3, Fig. 14a showing the same in elevation.

Figure 15 shows in plan the disc of Figure 12 in about the stage of the capping operation shown in Fig. 3, Fig. 15a showing the same in elevation.

Figure 16 shows in plan the disc of Figure 12 at the end of the capping operation as in Figure 4, Fig. 16a showing the same in elevation.

Figure 22 is an elevation partly in section of a capping head, container throat and a closure disc deformed prior to the capping operation.

Figure 23 is a view similar to that of Figure 22 but showing a different type throat, and Figures 24 to 29 show in plan six different forms of predeformed closure discs.

Figure 1:
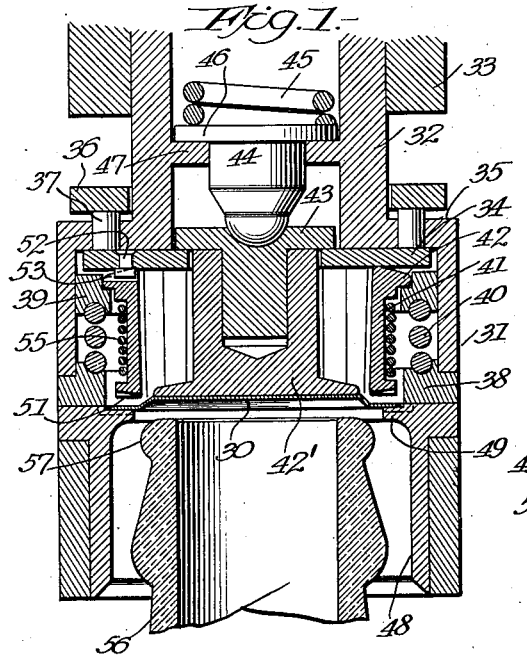
Figure 1 is an axial section through a capping head, a container neck and a closure disc in initial position, the capping head being designed to deform the closure disc in accordance with the present invention.

Referring first to Figures 1 to 16, reference numeral 30 designates a circular substantially flat closure disc of ductile material, ordinarily metal. As here shown, the disc is single-ply and its central portion is slightly upwardly offset to leave an annular marginal portion, these features most clearly appearing in Figures 1 to 4 and 12.

It should be stated here that the exact make-up of the disc is immaterial so far as the present invention is concerned and it may be single-ply as shown or may be provided with one or more plies of gasket or protective material. The disc may be entirely flat, if so desired, but it is preferred to use a disc with the described offset which serves as means for centering the disc on the container bead.

In Figures 1 to 4, reference numeral 31 designates generally a capping head carried by a neck 32 which, in turn, is mounted in a support 33, upward displacement of the neck relative to the support 33 being provided for. An annulus 34 is positioned in the head beneath the top wall 35 thereof and is secured to an external annulus 36 by means of studs 37 slidable in apertures in wall 35. Interposed between a fixed flange or seat 38 and a superposed slidable ring 39 is a compression spring 40.

A throat 41 has a top annular rib 42 supported on a ledge formed on ring 39, spring 40 holding the top edge of the throat against annulus 34.

A presser tool 42' is arranged coaxially with throat 41 and is supported on annulus 34 by means of a cap 43, the latter being engaged by the globular extremity of a stud 44, which is urged downwardly by a compression spring 45, downward movement of the stud being limited by the abutment of its head 46 with a rib 47 formed in the neck.

The head 31 also includes a sleeve-like element 48 which, at its top, has an inwardly projecting annular ledge 49 below the lower outer portion of the bottom surface of throat 41.

Elements 41 and 49 are generally the same as shown in the copending application of Huntley and Rau, Serial No. 622,154, filed July 12, 1932, and consequently need not be described at length here as regards their general features. However, according to the present invention the top of ledge 49 is notched, as particularly shown in Figures 7 and 8, to provide regularly spaced radially extending teeth 50 and the bottom of throat 41 is notched to form regularly spaced radially extending teeth 51, the spacing of the two sets of teeth being similar. As will be seen from Figure 8 in particular, the height of teeth 50 is substantially uniform throughout their length, although this may be varied to some extent. As most clearly shown in Figures 9 and 10, teeth 51 increase in height from their inner to their outer ends, the inner ends of the teeth, as well as the ends of the spaces between them, being rounded as shown.

As shown in Figures 1 to 4, throat 41 and ledge 49 are coaxially arranged, their angular relation being such as to enable their teeth to mesh when the two elements are approached. Sleeve 48 is fixed in the head and the angular disposition of the throat is maintained by means of a rivet 52 secured in annulus 34 and having a downwardly projecting head engaged in a radial slot 53 in the top of the throat. As here shown, the throat is composed of a number of segments 54 held together by means of an encircling spring 55, the throat being thus radially expansible. While this type of throat is preferred a solid or non-expansible throat may be used under considerations set forth in my copending application, Serial No. 641,288, filed November 4, 1932.

In Figure 1 a disc 30 is assumed to have been fed on to ledge 49 to be supported thereby and a bottle 56 is supported in coaxial relation to the head 31 beneath the disc. The mouth of bottle 56 has the usual bead 57 which has a top exterior surface outwardly convexed, that is, of increasing diameter from its top to its line or plane of maximum circumference, the bead presenting a shoulder below this line.

Upon relative movement of the support 33 and container 56 to approach them coaxially, and assuming that the support is being moved downwardly, the cap 30 comes to rest on top of the bead and is centered thereon by reason of its central offset portion. The presser tool 42 resting on the cap holds the latter firmly on the bead and prevents further downward movement of the head with the support, so that the support now moves downwardly relative to neck 32 eventually striking ring 36 and lowering annulus 34 and therewith throat 41 until teeth 51 enter between teeth 50, this downward movement relative to the head being limited by abutment of ring 36 with wall 35. At this point the relation of the parts is that shown in Figures 2, 10 and 11, and as particularly seen from the last-named figure the marginal portion of disc 30 between the throat and ledge is deformed by reason of the development therein of radial flutes 31'.

Further movement of support 33 causes the presser tool to rise against spring 45, the throat beginning to bend the marginal portion of the disc over the upper exterior surface of bead 57.

As shown in my first mentioned application, Serial No. 553,464, the inner lower edge of the throat commences an ironing action on the disc margin substantially at the top of the bead so as to exert a prolonged ironing action thereon. As explained in my application, Serial No. 641,288, however, this prolonged action is not essential to the operation and the diameter of the lower inner edge of the throat need be only slightly less than the diameter of the bead in its plane of maximum circumference plus twice the thickness of the disc. This latter arrangement is preferred in the present case, in order to avoid a prolonged scoring or fluting bending action on the disc above its plane of maximum circumference by the inner ends of teeth 51.

Figure 3:
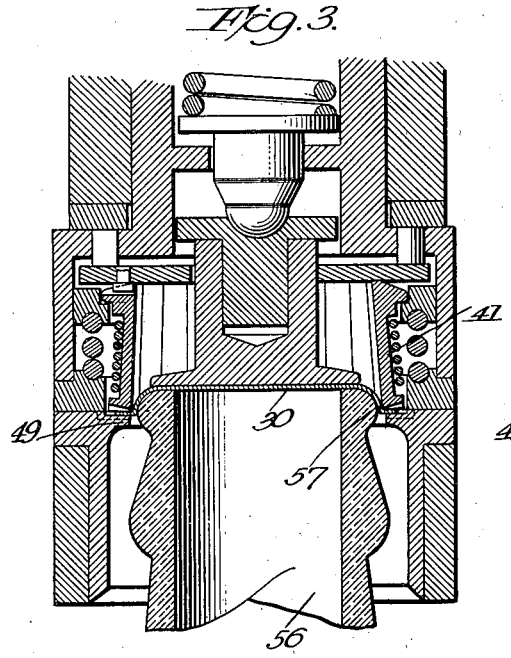
Figure 3 shows the elements of Figure 1 in a third relation.
Figure 4:
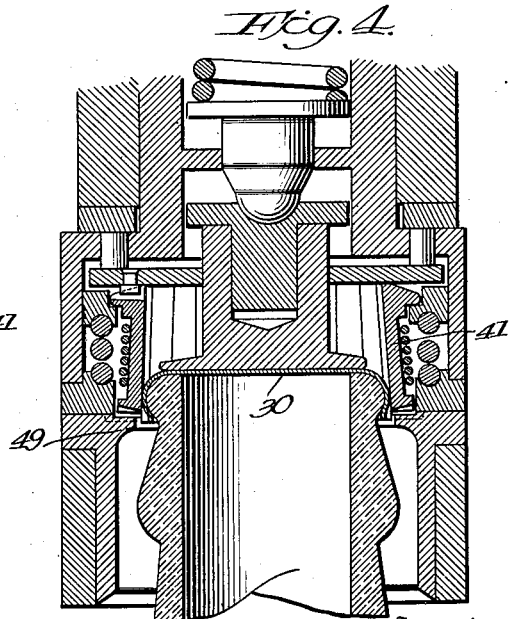
Figure 4 shows the elements of Figure 1 in a fourth relation.

In Figure 3 the ironing action has just been initiated, a concomitant of this action being a strong drawing action so that, as a result of the two actions, the disc material is smoothly conformed to the top exterior surface of the bead.

As the operation continues from the position of Figure 3 the disc margin passes inwardly off of ledge 49, and, due to the stresses which have been set up by the ironing action, freely buckles under the bead to form a crimped locking band. Due to the initial fluting of the disc margin the crimping lines have been prescribed or predetermined so that the locking crimps occur at regular intervals circumferentially.

In Figure 12 the disc is shown in its initial form wherein its marginal portion is preferably flat. In Figure 13 the marginal portion of the disc has been provided with its radial flutes, the operation being at the point illustrated in Figure 2. In Figure 14 the bending of the disc over the bottle bead has been initiated, and in Figure 15 the ironing action has been substantially completed. In Figure 16 the extreme marginal portion of the disc is buckled under the bead forming regularly spaced crimps predetermined by the flutes first appearing at the stage of the operation shown in Figure 13. Any portion of the flutes above the plane of maximum circumference of the disc is ironed or drawn out as the operation progresses.

Figure 17:
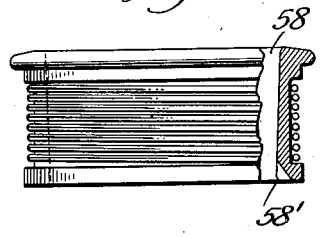
Figure 17 shows a modified form of sealing throat in elevation and partly in section.
Figure 18:
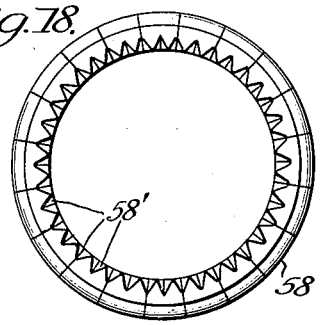
Figure 18 is a plan view of the throat of Figure 17.

In Figures 17 and 18 a throat 58 of the same expansible type heretofore described has its lower inner edge provided with regularly spaced notches forming teeth 58'. Where a notch or a tooth comes between two of the throat segments, it is preferably bi-sected by the line of division between the segments and the same applies to the notch and tooth formation described above with reference to throat 41. Teeth 58' are bounded laterally by substantially plane surfaces converging at the tips thereof, the formation being substantially such as would result if the notches were formed by a three-cornered file. The tips of teeth 58' are rounded as shown.

Figure 19:
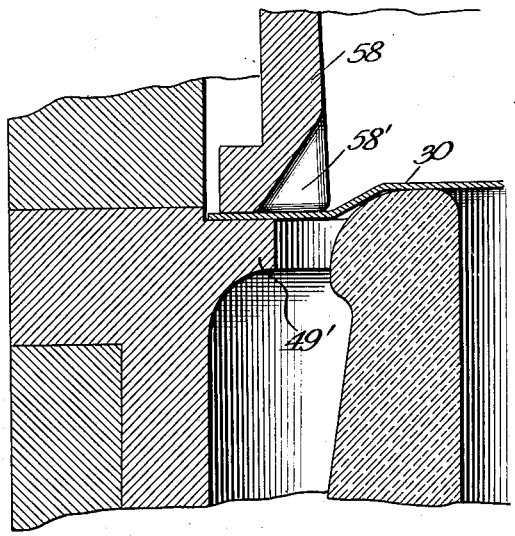
Figures 19 to 21 show on enlarged scale a portion of the throat of Figures 17 and 18 and associated parts in progressive stages of the capping operation.
Figure 21:
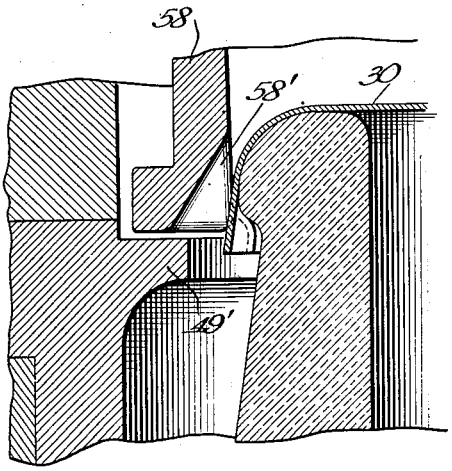
Figure 20:
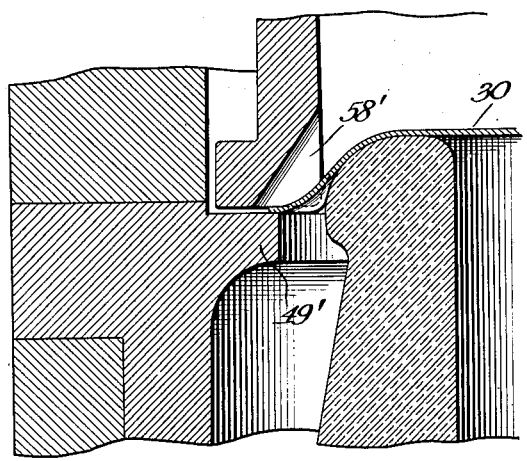

In the use of the throat 58 the capping head organization is the same as that heretofore described with the exception that ledge 49', Figures 19 to 21, has a plane top surface. Figure 19 shows the capping operation at the stage illustrated in Figure 2, wherein ledge 49' and throat 58 have been mutually approached but not to such an extent as to clamp the marginal portion of disc 30 between them. In Figure 20 the capping head is moving downwardly relative to the container and teeth 58' are carrying out a fluting or corrugating action on the disc margin while simultaneously ironing and drawing the same into substantial conformation with the top external surface of the bead. In Figure 21 the operation has been completed and locking crimps have been formed under the bead forming a band substantially as shown in Figure 16.

While the mechanism just described gives a satisfactory seal with a regularly crimped locking band and substantially smooth conformation of the disc to the bead above the plane of maximum circumference of the latter, it will be seen that due to the vertical extent of teeth 58' the skirt of the closure will be scored at the plane of maximum circumference of the bead. The effect may be improved in this respect by shortening the vertical extent of teeth 58' so that their tops pass slightly below the plane of maximum circumference of the bead when the parts are in the position shown in Figure 21. The apparatus shown in Figures 17 to 21 is somewhat more economical to manufacture than that first described, in that ledge 49' is finished with a plane top surface. Further, the rivet 52 and groove 53, shown in Figure 1, may be omitted in view of the fact that angular movement or rotation of throat 58 relative to ledge 49' is permissible, due to the absence of teeth on the latter.

Figure 2:
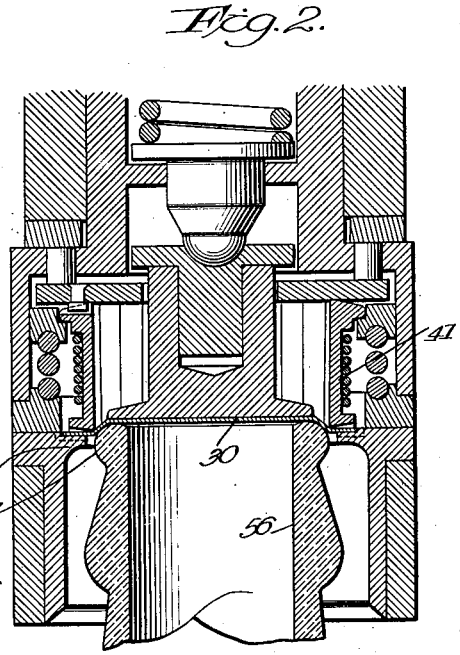
Figure 2 shows the elements of Figure 1 in a second relation.

In Figures 22 to 24, disc 30 is conceived of as being provided with the flutes 30' in an operation prior to the capping operation. The flutes may have been formed in the original punching operation or formed in a subsequent operation, such as might be carried out by the apparatus shown in Figures 1 to 4 if the operation were concluded at the stage shown in Figure 2. In other words, the pre-deformed disc of Figures 22 to 24 is the disc as seen in Figure 2.

Inasmuch as the flutes 30' have been formed in an operation prior to the capping operation, the discs may be applied by the apparatus shown in the Huntley and Rau application above mentioned, wherein the throat and ledge have opposed plane surfaces. In Figure 22, reference numerals 59 and 60 designate respectively such a throat and ledge. The ironing action may begin substantially at the top of the bead as in the application last mentioned, although, as shown in Figure 22, the throat is of such size as to initiate the ironing action immediately above the plane of maximum circumference of the bead as fully described in my above mentioned application, Serial No. 641,288. The capping operation is exactly the same as that described in my said application. In view of the flutes, however, movement of throat 59 toward ledge 60 must be less than that required with a flat disc margin so as not to crush the flutes. This shortened movement can be readily brought about by slightly shortening the studs 61. The applied cap has the same appearance as in Figure 16.

In Figure 23 the same cap 30 is shown and the remainder of the apparatus is the same as that of Figure 22 with the exception of the throat 62 here shown as being solid or non-expansible. The considerations involved in the use of such a throat are fully set forth in my application, Serial No. 641,288 and need not be repeated here. It is sufficient to state that the capping operation is the same as that heretofore described, the applied cap appearing as in Figure 16.

In Figures 25 to 29 I have shown further embodiments of closure discs having deformed marginal portions. In Figure 25 disc 63 is provided with regularly spaced score lines 64 on its top or bottom or both, these score lines being radially directed. This weakening of the disc margin prescribes the crimping lines as the disc margin locks under the container bead.

In Figure 26 disc 65 is provided with radial score lines 66, and is also provided with a circular score line 67 spaced inwardly from the edge of the disc and defining the marginal portion thereof, the radial score lines terminating inwardly at line 67. Line 67 is so placed as to come into or slightly below the plane of maximum circumference of the bead upon application of the closure and limits the upward extent of the crimps which are determined by lines 66.

In Figure 27 disc 68 is provided throughout its circumference with regularly spaced small notches or nicks 69, these weakening the marginal portion of the disc in such a manner as to prescribe the crimping lines upon application of the disc. Disc 70, of Figure 28, is provided not only with nicks 71, corresponding to nicks 69 of Figure 27, but also with radial scores 72 and a circular score 73 as the disc of Figure 26. The nicks and radial scores cooperate in determining the crimp lines, the extent of the crimps being limited by the circular score.

In Figure 29 disc 74 is provided with a radially projecting tongue 75 and the disc margin, including the tongue, may be provided with circumferentially spaced radial scores 76 which determine the crimp lines. Upon application of disc 74 tongue 75, being freely projecting, may be grasped for the purpose of removing the closure.

The closure discs of Figures 25 to 28 may be applied by the identical devices shown in Figures 22 and 23. Similar devices may be utilized in the application of disc 74 of Figure 29. Preferably, however, in the use of the apparatus of Figure 22, for example, ledge 60 would be suitably recessed to permit tongue 75 to pass therefrom simultaneously with the rest of the disc margin.

It will be understood that the specific description of mechanisms and closures above has been made merely by way of illustration of the general principles of the invention. The disclosure is not to be taken as restrictive of the invention, the scope of which is defined in the following claims.

I claim:

1. In apparatus for the application of substantially flat ductile disc closures to the externally beaded mouths of containers, a throat having a circular lower inner edge interrupted at regular intervals throughout its circumference, the diameter of said inner edge being less than the maximum diameter of the bead plus twice the thickness of the closure.

2. In apparatus for the application of substantially flat ductile disc closures to the externally beaded mouths of containers, an expansible throat having a circular lower inner edge interrupted at regular intervals throughout its circumference, the diameter of said inner edge being less than the maximum diameter of the bead plus twice the thickness of the closure.

3. In apparatus for the application of substantially flat ductile disc closures to the externally beaded mouths of containers, a throat having a lower inner ironing edge of a diameter less than the maximum diameter of the bead plus twice the thickness of the closure, said throat being provided with means for deforming the marginal portion of the disc to establish crimping lines therefor.

4. In apparatus for the application of substantially flat ductile disc closures to the externally beaded mouths of containers, an annular ledge for marginally supporting a closure disc, said ledge being radially toothed regularly throughout its circumference, a throat above said ledge substantially coaxial with said ledge and having a lower surface radially toothed regularly throughout its circumference and overlying the ledge with its teeth positioned for meshing with the teeth of the latter, means for mutually approaching the throat and ledge to flute the marginal portion of a disc supported on said ledge and for approaching the ledge and throat together and a container whereby the throat acts to iron and draw the disc material over the upper external surface of the container bead, the extreme marginal portion of the disc eventually passing from said ledge and taking a natural locking crimp under the bead along lines determined by the flutes.

5. In apparatus for the application of substantially flat ductile disc closures to the externally beaded mouths of containers, an annular ledge for marginally supporting a closure disc, said ledge being radially toothed regularly throughout its circumference, an expansible throat above said ledge substantially coaxial with said ledge and having a lower surface radially toothed regularly throughout its circumference and overlying the ledge with its teeth positioned for meshing with the teeth of the latter, means for mutually approaching the throat and ledge to flute the marginal portion of a disc supported on said ledge and for approaching the ledge and throat together and a container whereby the throat acts to iron and draw the disc material over the upper external surface of the container bead, the extreme marginal portion of the disc eventually passing from said ledge and taking a natural locking crimp under the bead along lines determined by the flutes.

6. The method of applying a substantially flat ductile disc closure to the externally beaded mouth of a container, said method comprising ironing and drawing the marginal portion of the disc over the top external surface of the bead to conform it to the latter, and deforming the extreme marginal portion of the disc whereby the natural buckling thereof under the bead, induced by the ironing operation, will take place along prescribed lines.

7. The method of applying a substantially flat ductile disc closure to the externally beaded mouth of a container, said method comprising ironing and drawing the marginal portion of the disc over the top external surface of the bead to conform it to the latter, and radially fluting the extreme marginal portion of the disc whereby the natural buckling thereof under the bead, induced by the ironing operation, will take place along prescribed lines.

8. The method of capping a container having a mouth surrounded by a bead, said method comprising providing a substantially flat ductile disc closure with marginal deformations substantially equally spaced circumferentially of the disc, the disc having a diameter greater than the maximum diameter of the bead, and ironing and drawing the marginal portion of the disc over the top external surface of the bead to conform it to the latter, the extreme marginal portion of the closure taking natural locking crimps under the bead, due solely to the stresses set up by the ironing operation, along lines determined by said deformations.

9. The method of capping a container having a mouth surrounded by a bead, said method comprising providing a substantially flat ductile disc closure with marginal deformations substantially equally spaced circumferentially of the disc, the disc having a diameter greater than the maximum diameter of the bead, placing the disc over the container mouth, and ironing and drawing the marginal portion of the disc over the top external surface of the bead to conform it to the latter, the extreme marginal portion of the closure taking natural locking crimps under the bead, due solely to the stresses set up by the ironing operation, along lines determined by said deformations.

10. In apparatus for the application of substantially flat ductile disc closures to the externally beaded mouths of containers, a throat having an annular bottom surface provided with radial flutes regularly spaced throughout its circumferential extent, the diameter of the lower inner edge of said throat being less than the maximum diameter of the bead plus twice the thickness of the closure.

GEORGE W. BOOTH.